United States Patent [19]

Ulman et al.

[11] Patent Number: 5,354,478
[45] Date of Patent: Oct. 11, 1994

[54] ALKALI METAL BOROHYDRIDE/ANIONIC POLYMER SOLUTIONS

[75] Inventors: Jeffrey A. Ulman, Beverly, Mass.; Walter Verstraeten, Mechelen, Belgium; Michael A. Cook, Boxford, Mass.; Willy Verleye, Brasschaat, Belgium; Lawrence J. Guilbault, Topsfield, Mass.

[73] Assignee: Morton International, Inc., Chicago, Ill.

[21] Appl. No.: 74,173

[22] Filed: Jun. 9, 1993

[51] Int. Cl.⁵ .......................... C02F 1/62; C02F 1/70
[52] U.S. Cl. ................................. 210/716; 210/719; 210/723; 210/734; 210/912; 252/175; 252/180
[58] Field of Search .............. 210/719, 720, 723, 724, 210/734, 716, 912–914, 732; 252/180, 175, 188.26

[56] References Cited

U.S. PATENT DOCUMENTS 4,975,203 12/1990 Cook et al. ........................ 210/716

Primary Examiner—Neil McCarthy
Attorney, Agent, or Firm—Robert M. Didrick; Gerald K. White

[57] ABSTRACT

An aqueous solution of sodium borohydride, sodium hydroxide, and an anionic polymer is useful for the reduction and separation of metals in wastewater and it is hydrolytically stable for a period of six months. It may also contain an alkali metal aluminate or alum. Thus, a one-package treatment of wastewater is provided by the invention described herein.

21 Claims, No Drawings

ALKALI METAL BOROHYDRIDE/ANIONIC POLYMER SOLUTIONS

BACKGROUND OF THE INVENTION

This invention relates to the preparation of an aqueous solution of an alkali metal borohydride, an alkali metal hydroxide, and an anionic polymer. It relates also to the use of said solution in the removal of metal ions from metal-bearing wastewaters.

The use of sodium borohydride to remove a dissolved metal ion from wastewater as a reduced precipitate in conjunction with the use of sodium aluminate and a commercial flocculent to coagulate the precipitate is taught in U.S. Pat. No. 4,975,203. Before the time of the invention taught in said '203 patent, the borohydride and aluminate were added sequentially. Up until the time of this invention, the flocculent has always been added to the wastewater after the borohydride and aluminate treatment.

SUMMARY OF THE INVENTION

It is an object of this invention to provide a novel composition comprising an alkali metal borohydride, an alkali metal hydroxide, water, and an anionic polymer.

It is a related object of this invention to provide a process for separating metal ions from wastewater wherein an aqueous solution containing the anionic polymer, the borohydride and the hydroxide is added to the wastewater.

It is another related object of this invention to provide a process for separating metal ions from wastewater wherein an aqueous solution containing the anionic polymer, the borohydride, the hydroxide, and an alkali metal aluminate is added to the wastewater.

It is another related object to provide a simplified process for removing metal ions from wastewater wherein only one chemical solution needs to be added.

These and other objects of the invention which will become apparent from the following description thereof are achieved by preparing an aqueous solution containing at least about 5 weight percent alkali metal borohydride, at least about 20 weight percent alkali metal hydroxide, and from about 0.05 to about 1.0 weight percent anionic polymer, and adding said solution to the wastewater in an amount sufficient to reduce the metal and flocculate it. Such solutions of the sodium borohydride, sodium hydroxide, and an anionic polymer are hydrolytically stable for a period of six months. The aqueous solution may also contain from about 2 to about 5 per cent by weight of an alkali metal aluminate or alum (i.e., aluminum potassium sulfate), expressed as aluminum oxide.

DETAILED DESCRIPTION OF THE INVENTION

As used herein, the terms "metal" "metal-containing wastewater" and "metal removable from wastewater" refer to an ion of any element that is reducible by sodium or potassium borohydride to produce a particulate species which comes out of solution in such wastewater. Such metals may be from the group known as transition metals, from the lanthanide or actinide series, and from the group of elements having moderate electrical conductivity known as semiconductors. Generally, such metals meet the definition of heavy metals found in *Concise Chemical and Technical Dictionary*, H. Bennett, ed., 1947,Chemical Publishing Co., Inc., Brooklyn, N.Y.: ". . . metals which can be precipitated by hydrogen sulfide in acid solution, e.g., lead, gold, mercury, bismuth, and copper." Metals of Groups III A, IV A, V A and VIA of the periodic table having an atomic number of 31 or higher also exemplify the terms. Antimony, arsenic, bismuth, selenium, tellurium, and polonium also are examples of the metal ions that may be reduced by the method of this invention. When copper, nickel, or cobalt is to be separated by the method of this invention, a bisulfite catalyst can be advantageously used in conjunction with the borohydride and anionic polymer.

The anionic polymer has a number molecular weight of from about 3000 to about 18 million, preferably at least about one million, and thus the term polymer is intended to include oligomers for the purposes of this invention. Examples of the polymer include polyacrylates and polymethacrylates having as much as one ionic charge per 94 units of molecular weight, and copolymers of an olefin such as ethylene and propylene with acrylic or methacrylic acid. Hydrolyzed polyacrylamides and also exemplify the anionic polymer. The degree of hydrolysis may be as much about 100% thereby providing an essentially nitrogen-free polymer, or it may be as low as about 15%. Copolymers and homopolymers of maleic anhydride which have been hydrolyzed further exemplify the anionic polymers and oligomers useful in this invention. It is preferred to use highly charged anionic polymers, i.e., those having a high ratio of carboxylate groups pendant from the polymer chain and exemplified by a 50% hydrolyzed polyacrylamide which has one charge per 175 molecular weight units. Anionic polymers useful as flocculents in this invention are available from American Cyanamid Company, Betz Laboratories, and Allied Colloids. Examples of very high molecular weight, highly charged polymers include the Betz 1120 flocculent, and Cyanamid's Magnifloc 832A, 834A, 835A, 866A and 870A flocculents. The 870A product is substantially nitrogen-free as are Allied's Percol 511 and 611. Cyanamid's Magnifloc 836A flocculent is an example of an anionic polymer having a moderate charge density. Each of these flocculents is a dry powder but emulsions of anionic polymers are also contemplated for the practice of this invention. Oligomers of maleic and/or acrylic acid and salts thereof, as exemplified by the Belsperse 161 and Belclene 200 and 283 scale/deposit control agents from FMC, and the Cyanomer P-35 and P-70 flocculents from Cyanamid, whose number average molecular weight ranges are 3000 to 5000 and 8000 to 10,000, respectively, are also useful in this invention.

The amounts of alkali metal borohydride and hydroxide may vary over wide ranges both with respect to the total amount of each in solution and the relative amounts of each. For efficiencies of shipment and storage, solutions of the borohydride and hydroxide generally contain at least about 1% by weight of the former and at least about 20% by weight of the latter. Preferably, the solutions contain from about 5% to about 10% by weight of an alkali metal borohydride. The hydroxide is present primarily for the purpose of reducing hydrolysis of the borohydride and thereby the evolution of hydrogen. For optimum shipping and storage stability, the hydroxide should comprise at least about 30 to about 40 wt. percent of the solution but lower concentrations of sodium hydroxide or the correspondingly larger amount of potassium hydroxide will suffice. On the other hand, if the solution is made up on site and used immediately before substantial hydrolysis of the borohydride can occur, the hydroxide may comprise as little as about 0.4 wt. percent of the solution.

The amount of anionic polymer that is added to the borohydride solution may be from about 0.05 to about 1.0 wt. percent of the total weight of the solution when the polymer is measured as a dry powder and correspondingly more when measured as an emulsion and adjusting for the liquid content of the emulsion. A preferred amount of the dry powder is from about 0.2 to about 0.4 wt. percent on the same basis. A preferred method for mixing the polymer, borohydride and hydroxide is to add water to a mixing tank, followed by the anionic polymer, a 50% aqueous solution of additional hydroxide (when required), and an aqueous solution containing 12% by weight of sodium borohydride and 40% by weight of sodium hydroxide (or the equivalent amounts of the potassium counterparts thereof).

Efficiencies of shipping and storage are, of course, achieved if the solution is as concentrated as possible. For that reason and because of the low treatment level described below, the total solids in the solution may reach up to about 55 wt. percent.

Generally, the solution is used in an amount sufficient to provide at least about two to four times the amount of borohydride theoretically required to chemically reduce the metal in the wastewater to an insoluble lower valent or elemental form. The total volume of the solution of borohydride, hydroxide and polymer that is added to the wastewater will depend upon a variety of factors, such as concentration of the compounds in the solution and concentration and type of metal ions in the wastewater. So as not to significantly add to the volume of the waste stream, the solution is generally added at significantly less than 1% of the volume of the wastewater. The volume should, of course, be consistent with the necessities of good mixing and accurate metering of the solution.

It may be desirable to adjust the pH of the wastewater in order to maximize the rate of reduction of the metal ions by the borohydride. Generally, the pH may be as high as 9 or even 11. For systems employing a bisulfite catalyst (typically when the primary metal is copper, nickel, or cobalt), a pH range of 4-8, preferably 4.5 to 6, is desirable. The borohydride solution is, of course, highly alkaline. To achieve the proper pH in the reduction/coagulation zone, the pH of the wastewater may be adjusted downward prior to the addition of the alkaline solution or direct pH control may maintained in the metal recovery zone itself.

The addition of the composition of this invention to the wastewater involves minimal, if any, changes from the processes employing the VenMet ® sodium borohydride solution commercially available from Morton International, Inc. The initial pH of the wastewater should be the same or slightly lower than that which is operable when using the VenMet solution. The preferred compositions of this invention contain a higher ratio of hydroxide to borohydride than that found in the VenMet solution. As a result, addition of the compositions of this invention can cause the pH of the wastewater to rise above the optimal value in some cases unless a lower initial pH or an increased acid feed rate is used. The compositions of this invention are added to the wastewater at the same point in the continuous treatment scheme as when only the VenMet solution is used prior to a separate addition of anionic polymer. The residence time for the reduction in the presence of the anionic polymer is generally slightly longer. Reaction control via the oxidation/reduction potential (ORP) is used and the set point is the same as that used with the VenMet solution of borohydride alone. After reduction is complete, the wastewater flows to a tank where a cationic polymer may be added in some cases to improve the separation of the solid and liquid, especially when using the oligomers. Cyanamid's Magnifloc ® 2535CH and Magnifloc 573C resins are suitable cationic polymers for that purpose. The treated wastewater then typically flows to a clarifier, the overflow from which feeds into a filter and the effluent is then discharged. Solids from the bottom of the clarifier are fed to a filter press. Surprisingly, we have found that the presence of a high molecular weight anionic polymer significantly increases the stability of an aqueous solution of the alkali metal borohydride and hydroxide. We have also found, again surprisingly, that an improved separation of the reduced metal particles is achieved when such a solution is added to the wastewater instead of adding a borohydride solution and allowing the reduction to go to completion before a separate addition of the polymer is made. Without implying any limitation on the invention herein, it is postulated that the presence of the anionic polymer during borohydride reduction of the metal confers a negative charge to a reduced metal particle by adsorption of the polymer on the surface of the particle. Subsequent treatment of the suspension with a cationic flocculent bridges these negatively charged particles to form macroscopic flocs which settle rapidly.

EXAMPLES 1-4

A variety of compositions were prepared using various representative anionic polymers or oligomers as shown in Table I. The anionic polymer is first mixed with water, the NaOH solution is added, and finally the VenMet borohydride solution is mixed into the blend with stirring. The hydrolytic stability of the compositions of this invention and of the two control compositions was tested by measuring the hydrogen evolution from 100 gram samples of the solutions as they were held at a constant 58° C. in 250 ml flasks immersed in a heated oil bath. Two tests were run, each extending over a period of 5 weeks. The average decomposition rate of each solution described in Table I per 24 hour period was calculated from the results. Said rates and the average of the two for each period are shown in Table II.

TABLE I

| Ex. No. | Composition (% wt.) | | | | |
|---|---|---|---|---|---|
| | Water | AC 870A* | 1226** | 50% NaOH | VenMet ® |
| 1 | 42.8 | 0.1 | — | — | 57.1 |
| 2 | 28.5 | 0.1 | — | 14.3 | 57.1 |
| 3 | 42.8 | — | 0.1 | — | 57.1 |
| 4 | 28.5 | — | 0.1 | 14.3 | 57.1 |
| Cont #1 | 42.8 | — | — | — | 57.1 |
| Cont #2 | 28.5 | — | — | 14.3 | 57.1 |

*Cyanamid's Magnifloc 870A - nitrogen-free, fully anionic polyacrylic flocculent, number average mol. wt.: about 200,000
**Cyanamid's Superfloc 1226 - nitrogen-free, fully anionic polyacrylic flocculent, number average mol. wt.: 14-18 million

TABLE II

| Ex. No. | Decomposition Rate $\times\ 10^{-2}$ | | |
|---|---|---|---|
| | Run #1 | Run #2 | Average |
| 1 | 9.3 | 11.2 | 10.3 |
| 2 | 1.6 | 1.9 | 1.8 |

TABLE II-continued

| Ex. No. | Decomposition Rate × $10^{-2}$ | | |
|---|---|---|---|
| | Run #1 | Run #2 | Average |
| 3 | 13.5 | 14.8 | 14.2 |
| 4 | 2.1 | 2.0 | 2.1 |
| Cont #1 | 33.0 | 47.0 | 40.0 |
| Cont #2 | 1.9 | 2.0 | 2.0 |

EXAMPLES 5-11

In order to compare the effectiveness of the method of this invention with the prior art wherein the borohydride was added separately from the anionic polymer, a series of tests were performed in which the exact same quantities of reagents were added, either sequentially or as a blend thereof in aqueous solution, to a simulated wastewater containing 100 ppm of copper ion (as copper sulfate) chelated by an equivalent amount of EDTA (as a 30% Na$_4$EDTA solution). For that purpose, the solution in each Example was made up by first dissolving the anionic polymer in water, then adding a 50% NaOH solution, and finally the VenMet ® borohydride solution. Each solution contained 0.1% anionic polymer, 6.8% NaBH$_4$, 30% NaOH, and 63.1% water, by weight. The identification of the polymer in each Example is given in TABLE III. In TABLE III, the pre-addition or post addition of a cationic material to the simulated wastewater relative to the addition of the borohydride/anionic pair is indicated. In all cases, separate of the reduced particulate metal was achieved by filtration through a medium having 0.8 micron pores. The final copper ion levels in the filtrate are shown as ppm in TABLE III, also.

TABLE III

| Ex. No. | Cationic | | Anionic | Final Cu level | |
|---|---|---|---|---|---|
| | Pre- | Post- | | Blend | Sep. |
| 5 | Alum | | MF-866A* | 0.29 | 0.62 |
| 6 | Alum | | MF-870A** | <0.10 | <0.10 |
| 7 | Alum | | SF-1226*** | 1.35 | 0.72 |
| 8 | | MF-573C† | MF-866A | <0.10 | <0.10 |
| 9 | | MF-573C | MF-870A | <0.10 | <0.10 |
| 10 | VSA-45++ | | MF-866A | 4.02 | <0.10 |
| 11 | VSA-45 | | MF-870A | 1.62 | 0.75 |

*Magnifloc 866A (Cyanamid) - very high mol. wt.; mod. charge
**Magnifloc 870A (see Ex. 1)
***Superfloc 1226 (see Ex. 3)
†Magnifloc 573C (Cyanamid) - low mol. wt.; high charge
++Vining's 45% sodium aluminate solution

EXAMPLE 12

A solution of the Magnifloc 870A flocculent, sodium hydroxide, VenMet borohydride solution, and sodium aluminate was prepared by dissolving the anionic polymer in water first and then adding 50% NaOH, the VenMet solution, and the VSA-45 solution. The quantities were such that the final solution contained 0.1% of the polymer, 5.0% of sodium borohydride, 32.4 % of sodium hydroxide, 2.9% sodium aluminate (expressed as aluminum oxide), and 59.7% water. This solution was added to the simulated wastewater (described in Examples 5-11) until an oxidation/reduction potential of −600 my was reached. Upon filtration to remove particles larger than 0.8 micron, the filtrate was found to contain 0.37 ppm of copper.

EXAMPLES 13-14

The general procedure of Examples 1-4 was followed in blending together an anionic oligomer having a number average molecular weight in the 3000-5000 range (Cyanamid's P-35 polymer) (Example 13) and an anionic acrylic oligomer having a number average molecular weight in the 8000-10,000 range (Cyanamid's P-70 polymer) (Example 14) with 50 % sodium hydroxide and the VenMet borohydride solution. The amounts of each component are given in TABLE IV.

TABLE IV

| Ex. No. | Composition (% wt.) | | | | |
|---|---|---|---|---|---|
| | Water | P-35 | P-70 | 50% NaOH | VenMet ® |
| 13 | 31.3 | 0.35 | — | 26.6 | 41.7 |
| 14 | 26.7 | — | 5.0 | 26.6 | 41.7 |

While the invention has been described with reference to certain embodiments thereof, modifications obvious to one of ordinary skill in the art may be made without departing from the scope of the invention.

The subject matter claimed is:

1. A composition consisting essentially of, by weight, at least about 5% alkali metal borohydride, at least about 20% alkali metal hydroxide, water, and from about 0.05 to about 1.0% anionic polymer or oligomer.

2. The composition of claim 1 wherein the polymer or oligomer has a molecular weight of from about three thousand to about eighteen million.

3. The composition of claim 1 wherein the polymer or oligomer is a hydrolyzed polyacrylamide.

4. The composition of claim 1 wherein the polymer or oligomer is a copolymer of an olefin and acrylic and/or methacrylic acid.

5. The composition of claim 1 wherein the polymer or oligomer is a hydrolyzed homopolymer or copolymer of maleic anhydride.

6. The composition of claim 1 wherein the borohydride is from about 5 to about 10%, the hydroxide is from about 20 to about 30%, and the polymer is from about 0.05 to about 1.0% of the total weight.

7. The composition of claim 1 wherein the anionic polymer has a molecular weight of about 200,000.

8. The composition of claim 1 further comprising alum or sodium aluminate.

9. The composition of claim 7 further comprising alum or sodium aluminate.

10. The composition of claim 8 wherein the amount of alum or sodium aluminate is from about 2 to about 5% by weight, expressed as aluminum oxide.

11. A method for separating a metal from wastewater comprising:
preparing a solution consisting essentially of by weight, at least about 5% alkali metal borohydride, at least about 20% alkali metal hydroxide, and from about 0.05 to about 1.0% anionic polymer, and
adding said solution to the wastewater in an amount sufficient to reduce the metal and coagulate it.

12. The method of claim 11 wherein the polymer or oligomer has a molecular weight of from about three thousand to about eighteen million.

13. The method of claim 11 wherein the polymer or oligomer is a hydrolyzed polyacrylamide.

14. The method of claim 11 wherein the polymer or oligomer is a hydrolyzed homopolymer or copolymer of maleic anhydride.

15. The method of claim 11 wherein the polymer or oligomer is a copolymer of an olefin and acrylic and/or methacrylic acid.

16. The method of claim 11 wherein the borohydride is from about 5 to about 10%, the hydroxide is from about 20 to about 30%, and the polymer or oligomer is from about 0.05 to about 1.0% of the total weight of the solution.

17. The method of claim 11 wherein the solution also contains alum or sodium aluminate.

18. The method of claim 11 wherein the polymer has a molecular weight of about 200,000.

19. The method claim 17 wherein the polymer has a molecular weight of about 200,000.

20. The method of claim 17 wherein the amount of alum or sodium aluminate is from about 2 to about 5% by weight, expressed as aluminum oxide.

21. The method of claim 11 wherein the metal is selected from the group consisting of a transition metal, a metal of the lanthanide or actinide series, and metals of Group IIIA–VIA of the periodic table having an atomic number of 31 or higher.

* * * * *

UNITED STATES PATENT AND TRADEMARK OFFICE
CERTIFICATE OF CORRECTION

PATENT NO. : 5,354,478
DATED : October 11, 1994
INVENTOR(S) : Ulmann, et. al.

It is certified that error appears in the above-indentified patent and that said Letters Patent is hereby corrected as shown below:

Title page, item [75], inventor: change "Michael A. Cook" to read -- Michael M. Cook--.

Signed and Sealed this

Twenty-eight Day of March, 1995

Attest:

BRUCE LEHMAN

*Attesting Officer*  *Commissioner of Patents and Trademarks*